UNITED STATES PATENT OFFICE.

JOHN WILLIAM HOPPER, OF HOLYOKE, MASSACHUSETTS.

COMPOSITION.

No. 829,155.  Specification of Letters Patent.  Patented Aug. 21, 1906.

Application filed July 14, 1905. Renewed May 29, 1906. Serial No. 319,360.

*To all whom it may concern:*

Be it known that I, JOHN WILLIAM HOPPER, a citizen of the United States of America, residing at Holyoke, in the county of Hampden and State of Massachusetts, have invented a new and useful Composition, of which the following is a specification.

My invention relates to a brazing compound particularly designed for cast-iron work, but which may be effectually employed for brazing other metals.

The compound consists of: steel dust or grindings, one pound; bronze, (preferably phosphor-bronze,) one-half pound; sodium carbonate, one-half pound; potassium nitrate, (saltpeter,) one-fourth pound; potassium cyanid, one-fourth pound; sal-ammoniac, two ounces, and borax (green) two ounces.

I preferably employ forged tool-steel dust or grindings from a steel-grinding wheel. This is thoroughly mixed with the other ingredients, which are ground or pulverized for incorporation therewith. The ordinary pulverized carbonate of soda, saltpeter, cyanid of potash, and sal-ammoniac of commerce may be used.

The compound made as above described may be employed in a dry state, or a liquid compound may be used by combining the first six ingredients with a saturated solution of borax in water and one-half pint of wood-alcohol.

I have found that a brazing compound made of these ingredients yields superior results, the bronze being fusible at less heat and forming a stronger and tougher bond than copper, commonly employed, while its constituents more readily combine with the joined parts. The sal-ammoniac and borax are used as fluxing mediums, and the sodium carbonate and cyanid of potassium reduce the formation of oxid or scale to a material extent, while the cyanid also pierces or opens up the pores of the metal to a highly efficient degree to render the union strong and durable.

As stated, I preferably employ the ordinary phosphor-bronze of commerce; but I may employ any of the ordinary bronzes composed of copper and tin or copper, tin, and zinc, the latter being preferred when phosphor-bronze is not used.

The function of the saltpeter is to assist the cyanid of potassium in opening up and piercing the pores of the metal, and while this substance is an oxidizer its oxidizing properties are more than counteracted by the sodium carbonate and cyanid of potassium, so that the several substances coact to form a tough homogeneous alloy which will strongly bind the parts to be bound at a much less heat and at the expenditure of much less time and labor than brazing compounds ordinarily used.

Having thus described the invention, what is claimed as new is—

1. A brazing composition including iron, bronze, a fluxing medium, and an oxid-reducing medium.

2. A brazing compound including iron, bronze, a fluxing medium, and cyanid of potash.

3. A brazing compound including iron, bronze, sodium carbonate, and potassium cyanid.

4. A brazing composition composed of iron, bronze, saltpeter, potassium cyanid, sal-ammoniac, and borax.

5. A brazing composition composed of iron, one pound, bronze, one-half pound, saltpeter, one-fourth pound, cyanid potash, one-fourth pound, sal-ammoniac, two ounces, and borax, two ounces.

In testimony whereof I affix my signature in presence of two witnesses.

JOHN WILLIAM HOPPER.

Witnesses:
 MARY A. REILLY,
 OSCAR C. FERRY.